United States Patent [19]

Benson et al.

[11] Patent Number: 4,613,080

[45] Date of Patent: Sep. 23, 1986

[54] MULTIPLE OUTLET TRICKLE IRRIGATION UNIT

[75] Inventors: Briant E. Benson, Santa Barbara; Richard D. Brown, Glendora, both of Calif.

[73] Assignee: Rain Bird Sprinkler Mfg. Corp., Glendora, Calif.

[21] Appl. No.: 626,130

[22] Filed: Jun. 29, 1984

[51] Int. Cl.[4] .............................................. B05B 1/30
[52] U.S. Cl. .................................... 239/542; 239/272; 239/393; 138/45
[58] Field of Search ............... 239/542, 271, 272, 394, 239/396, 391, 393, 436, 443; 138/45

[56] References Cited

U.S. PATENT DOCUMENTS

| | | | |
|---|---|---|---|
| 2,213,955 | 9/1940 | De Freitas | 299/107 |
| 2,790,680 | 4/1957 | Rosholt | 239/394 |
| 3,292,378 | 12/1966 | Rosenthal et al. | 239/547 |
| 3,383,050 | 9/1966 | Crist et al. | 239/436 |
| 3,693,888 | 9/1972 | Rondas et al. | 239/545 |
| 3,777,980 | 12/1973 | Allport | 239/534 |
| 3,779,468 | 12/1973 | Spencer | 239/542 |
| 3,797,741 | 3/1974 | Spencer | 239/11 |
| 3,799,441 | 3/1974 | Delmer | 239/145 |
| 3,807,430 | 4/1974 | Keller | 137/504 |
| 3,817,454 | 6/1974 | Pira | 239/76 |
| 3,819,118 | 6/1974 | Brock et al. | 239/276 |
| 3,834,628 | 9/1974 | Selman | 239/542 |
| 3,873,031 | 3/1975 | Reeder | 239/542 |
| 3,887,139 | 6/1975 | Pearce | 239/542 |
| 3,910,500 | 10/1975 | Hardison | 239/310 |
| 3,921,905 | 11/1975 | McElhoe et al. | 239/110 |
| 3,954,223 | 5/1976 | Wichman et al. | 239/109 |
| 4,059,228 | 11/1977 | Werner | 239/106 |
| 4,077,570 | 3/1978 | Harmony | 239/107 |
| 4,084,749 | 4/1978 | Drori | 239/542 |
| 4,161,291 | 7/1979 | Bentley | 239/542 |
| 4,221,334 | 9/1980 | Christopher | 239/394 |
| 4,226,368 | 10/1980 | Hunter | 239/542 |

FOREIGN PATENT DOCUMENTS 2018113 10/1979 United Kingdom .

Primary Examiner—Joseph F. Peters, Jr.
Assistant Examiner—Scott D. Malpede
Attorney, Agent, or Firm—Kelly, Bauersfeld & Lowry

[57] ABSTRACT

An improved trickle irrigation unit includes a selector dial for controlling water flow through a plurality of outlet ports. The trickle unit comprises a valve housing having a water inlet port opening into one side of a pressure chamber, the other side of which is defined by a plurality of recessed flow patterns each leading to a respective one of the outlet ports. A resilient valve flap within the pressure chamber is hydraulically seated over the flow pattern and includes an array of flow passages alignable with selected flow patterns to permit water flow thereinto from the pressure chamber, with the flap deforming into the selected flow patterns for pressure-responsive flow control of water to the associated outlet ports. The valve flap is rotatably carried by the selector dial for movement to different set positions to alter the number of flow patterns aligned with flap flow passages thereby correspondingly altering the number of outlet ports in flow communication with the pressure chamber.

24 Claims, 14 Drawing Figures

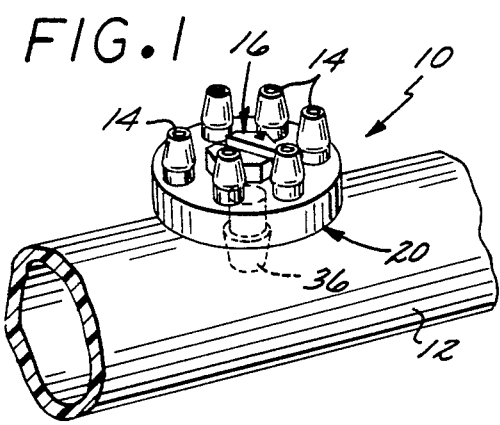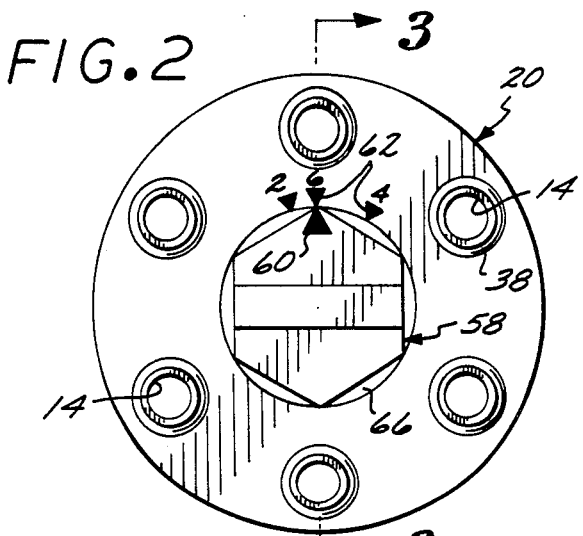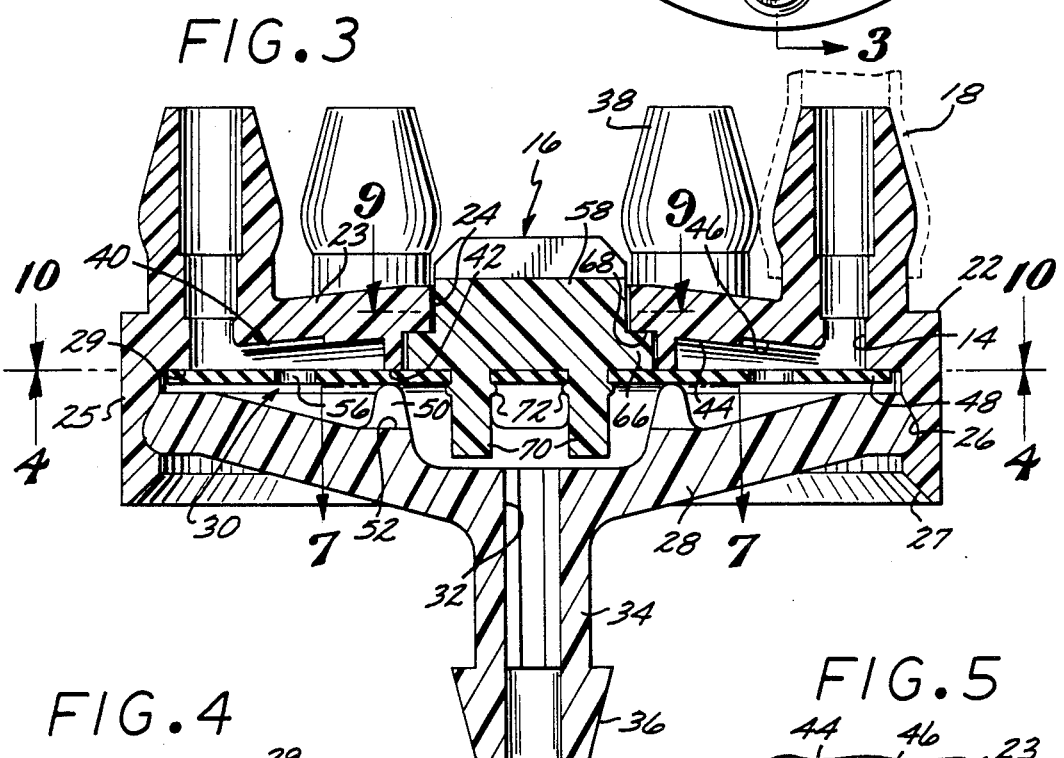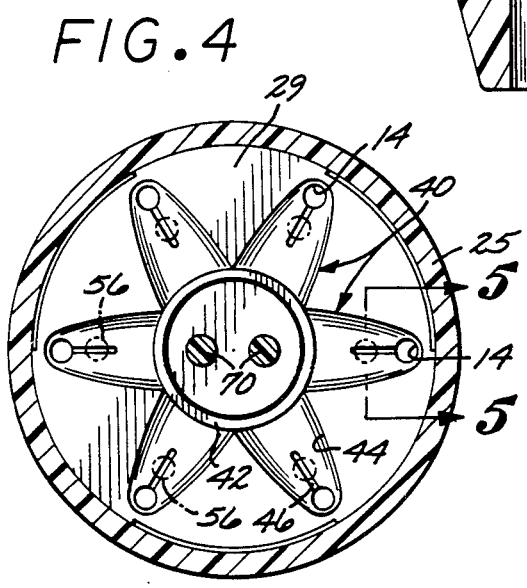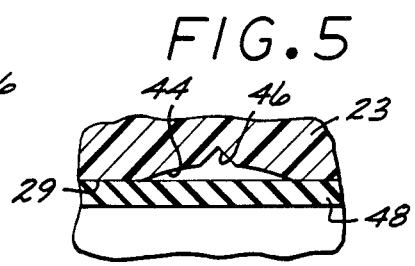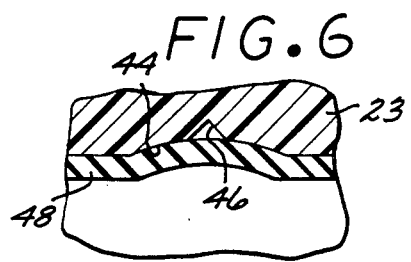

MULTIPLE OUTLET TRICKLE IRRIGATION UNIT

BACKGROUND OF THE INVENTION

This invention relates generally to trickle irrigation valve devices of a type adapted for installation through the wall of a water supply conduit, such as plastic tubing, garden hose, and the like. More particularly, this invention relates to an improved trickle irrigation unit for supplying relatively low flow rates of irrigation water through a variable selected number of outlet ports.

A wide variety of so-called trickle irrigation valve devices are known for use in supplying water at a relatively low, substantially drip flow rate to irrigate crops and the like without significant water evaporation and/or soil erosion. Such trickle irrigation devices are typically installed along the length of an elongated water supply conduit at predetermined points whereat irrigation water is desired, such as directly at the bases of individual plants, with water under pressure is being supplied through the conduit for flow into and through the trickle devices. The trickle devices are designed to discharge relatively small water flows at a substantially reduced pressure, such that the water is emitted without spraying at a low flow rate, such as on the order of about one-half gallon per hour.

In one common form, trickle irrigation devices have been provided as self-contained valve assemblies adapted for rapid mounting onto the exterior of a water supply conduit typically by means of a barbed inlet spike piercing the conduit wall. Water under pressure within the supply conduit is permitted to flow through the inlet spike into a pressure chamber having a resilient valve flap overlying a recessed flow pattern at one side of the pressure chamber. This valve flap cooperates with the recessed flow pattern to define a variable geometry flow path permitting controlled pressure-responsive water leakage to an outlet port for discharge to the exterior of the trickle irrigation unit. In many such trickle irrigation unit designs, the flow pattern is configured to permit a relatively high flushing flow to the outlet port when the pressure within the supply conduit is relatively low and to restrict water flow at comparatively higher conduit pressures to a relatively low, substantially drip rate. For one example of a trickle irrigation device of this general type, see U.S. Pat. No. 3,954,223.

Previous trickle irrigation devices have generally been limited to a single outlet port, whereby multiple trickle units have been necessary whenever a plurality of irrigation discharge flows are desired. This requirement for multiple trickle units can be disadvantageous, particularly when a plurality of discharge flows are required within a short length of the water supply conduit. For example, the short conduit span may be insufficient to accommodate the number of individual trickle units needed to provide the requisite number of discharge flows. Moreover, mounting of several closely spaced trickle units onto the supply conduit requires the formation of several closely spaced holes in the conduit wherein these holes can unduly weaken the conduit structure thereby increasing the risk of conduit failure during operation.

More recently, multiple outlet trickle irrigation devices have been proposed including a single inlet port permitting water inflow to a pressure chamber from which the water is discharged through a plurality of outlet ports. Such multiple outlet trickle devices advantageously have provided multiple discharge flows of irrigation water within a short length of the supply conduit without requiring multiple holes in the conduit wall. However, in many instances, the multiple outlet device provides discharge flows in a number which does not correspond with the number of discharge flows actually required or desired for a given application. Accordingly, with these previous multiple outlet devices, it has been necessary to provide additional components, such as closure caps and the like, for sealing off unused outlet ports. Such closure caps must be provided at additional expense and typically comprise relatively small items which can become lost or inadvertently removed from the trickle unit.

There exists, therefore, a significant need for an improved multiple outlet trickle irrigation unit having a plurality of outlet ports and further including integrated selector means for selectively and variably controlling the number of outlet ports through which irrigation water is discharged at a substantially trickle flow rate. The present invention fulfills this need and provides further related advantages.

SUMMARY OF THE INVENTION

In accordance with the invention, an improved trickle irrigation unit includes a plurality of outlet ports for discharge flow of irrigation water at a relatively slow, substantially drip or trickle flow rate, and selector valve means for selectively opening and closing the outlet ports to discharge water flow in variable combinations to permit water flow through a selected number of the outlet ports.

In a preferred form of the invention, the trickle irrigation unit comprises a valve housing defining an internal, relatively low profile pressure chamber. The valve housing is adapted for mounting onto a water supply conduit, such as by means of a barbed inlet spike piercing a wall of the conduit and preferably having a tubular construction to define a water inlet port opening into one side of the pressure chamber. The plurality of outlet ports are formed in the valve housing preferably in a circular array to open into the pressure chamber on the side thereof opposite the inlet port. The valve housing wall defining this opposite side of the pressure chamber is shaped to define a generally planar surface interrupted by a plurality of recessed flow patterns, with each flow pattern being defined by a relatively shallow flushing channel surrounding a central emitter groove leading to a respective one of the outlet ports.

A generally disk-shaped resilient valve flap within the pressure chamber overlies the flow patterns and the plurality of outlet ports. This valve flap has an array of relatively small flow passages formed therein in positions offset radially from the outlet ports to overlie a portion of the flushing channel and emitter groove of each recessed pattern. An externally accessible selector dial mounted on the valve housing rotatably supports the valve flap for movement to a plurality of set positions aligning different ones of the flap flow passages with different numbers of the recessed flow patterns within the pressure chamber.

In operation, water under pressure flowing into the pressure chamber hydraulically seats the valve flap against the planar surface whereby the flap covers the recessed flow patterns. In accordance with the selected set position of the valve flap, the water entering the pressure chamber is permitted to flow through a selected number of the flap flow passages which are aligned with adjacent flow patterns, with the remaining flap flow passages closed to water flow by flap engagement with the planar surface. The resilient flap is pressure-deformed into the aligned flow patterns to control water flow rate therethrough to the associated selected outlet ports. Selector dial rotation to an alternative set position varies the number of flap flow passages aligned with flow patterns in the valve housing, and thereby also varies the number of outlet ports through which water discharge flows are permitted.

Other features and advantages of the present invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a perspective view of a multiple outlet trickle irrigation unit embodying the novel features of the invention and illustrated installed onto a water supply conduit;

FIG. 2 is an enlarged top plan view of the trickle irrigation unit;

FIG. 3 is an enlarged transverse vertical section taken generally on the line 3—3 of FIG. 2;

FIG. 4 is a horizontal section taken generally on the line 4—4 of FIG. 3;

FIG. 5 is an enlarged fragmented vertical section taken generally on the line 5—5 of FIG. 4 and illustrating unit operation in a flushing mode;

FIG. 6 is an enlarged fragmented vertical section generally similar to FIG. 5 and illustrating unit operation in a trickle mode;

DETAILED DESCRIPTION OF THE PREFERRED EMBODIMENT

Figure 7:
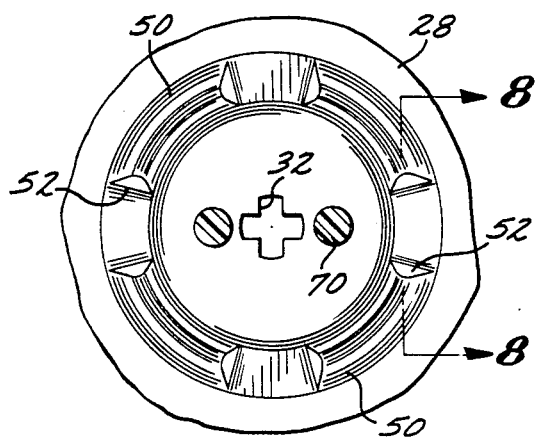
FIG. 7 is a fragmented horizontal section taken generally on the line 7—7 of FIG. 3.
Figure 8:
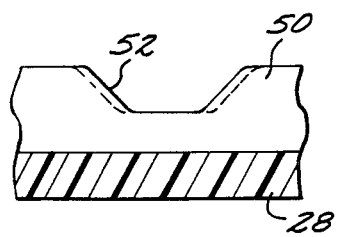
FIG. 8 is an enlarged fragmented vertical section taken generally on the line 8—8 of FIG. 7.

As shown in the exemplary drawings, the present invention is embodied in an improved multiple outlet trickle irrigation unit referred to generally by the reference number 10 for use in irrigating crops and the like. The trickle irrigation unit 10 is adapted for mounting along the length of a water supply conduit 12, and the unit 10 includes a plurality of outlet ports 14 through which relatively slow, substantially trickle irrigation water flows can be discharged. A selector dial 16 accessible from the exterior of the trickle unit 10 is rotatable to one of a plurality of set positions for variably selecting the number of outlet ports 14 open to discharge flow.

The trickle irrigation unit 10 of the present invention advantageously provides a selectively variable number of relatively slow, substantially trickle irrigation water flows, wherein each irrigation flow in turn can be controlled as a function of water pressure. More particularly, the selector dial 16 is rotatable quickly and easily to any one of several set positions to permit discharge flow through some or all of the outlet ports 14, in accordance with the selected set position. Accordingly, the trickle irrigation unit 10 can be installed onto the water supply conduit 12 and then set to provide the desired number of outlet flows without requiring additional components, such as closure caps and the like, which can become lost or removed from the unit. Moreover, if subsequent irrigation conditions require a change in the number of outlet flows from the trickle unit 10, the selector dial 16 can be adjusted quickly and easily to an alternate set position to provide the requisite number of outlet flows. These outlet flows can be permitted to drip directly from the outlet ports 14 or they can be guided substantial distances away from the unit through auxiliary tubing 18, as represented in dotted lines in FIG. 3 with respect to one of the outlet ports.

As shown in detail in the accompanying drawings, the trickle irrigation unit 10 of the present invention comprises a low profile, generally cylindrical valve housing 20 formed preferably from a lightweight and inexpensive molded plastic or the like. More particularly, the illustrative valve housing 20 comprises an upper main valve body 22 including a generally circular upper wall 23 having a central opening 24 formed therein. The outer periphery of this upper wall 23 is joined to a relatively short depending skirt 25 which in turn is formed to include an annular inside recessed track 26 and a lower guide surface 27 tapering outwardly and downwardly from a radial centerline of the valve body.

The main valve body 22 is sized and shaped for faciliated snap-fit reception of a circular lower plate 28 having a smoothly contoured outer periphery. As depicted in FIG. 3, this lower plate 28 may be pressed upwardly within the valve body 22 for seating of the plate periphery within the recessed track 26 in the inside surface of the skirt 25. Importantly, the track 26 is positioned within the skirt to retain the lower plate 28 in spaced relation with a planar inboard surface 29 of the valve body upper wall 23, whereby the valve body 22 and the lower plate 28 cooperate to define the valve housing 20 having an internal pressure chamber 30 of a relatively low profile, generally circular cross-sectional shape formed therein. Alternatively, if desired, other suitable connecting means can be provided for mounting the lower plate 28 onto the valve body 22.

From its outer periphery, the lower plate 28 of the valve housing 20 tapers downwardly and radially inwardly to an open inlet port 32. This inlet port 32 is appropriately coupled to the interior of the water supply conduit which may be formed from plastic pipe, garden hose, or the like, to permit water inflow from the conduit into the pressure chamber 30. In the exemplary embodiment of the invention, this coupling is achieved by forming the inlet port 32 to extend through a downwardly projecting inlet spike 34 having a tapered barb 36 at its lower end for pierced reception through the wall of the water supply conduit 12.

The plurality of outlet ports 14 are formed through the upper wall 23 of the main valve body 22 in a generally circular array disposed at radial positions near the outer skirt 25 and generally centered about the central wall opening 24. These outlet ports 14, six of which are shown in the exemplary drawings, thus open into the pressure chamber 30 on the side thereof opposite the inlet port 32. Conveniently, the outlet ports 14 are extended upwardly through relatively short upstanding outlet tubes 38 formed as an integral part of the valve body 22.

Within the pressure chamber 30, the planar inboard surface 29 of the upper wall 23 is interrupted by an array of recessed flow patterns 40 for controlling water flow to the respective outlet ports 14. More particularly, these flow patterns 40 correspond in number with the number of outlet ports 14 and are arranged to extend from an inner annular seat surface 42 in radially outboard directions toward the outlet openings. Each flow pattern 40 preferably comprises a relatively shallow flushing channel 44 of generally parabolic shape with a relatively wide open end adjacent the seat surface 42 and extending radially outwardly with a decreasing depth and a decreasing transverse width and terminating in an apex region circumscribing a respective one of the outlet ports 14. In addition, each flow pattern 40 includes a small central emitter grove 46 of substantially uniform depth and width to extend radially through an outer region of the associated flushing channel 44 to open directly into the adjacent outlet port 14.

A relatively thin, generally disk-shaped valve flap 48 of a suitable resilient elastomeric material is positioned within the pressure chamber 30 between the lower plate 28 and the planar surface 29 of the main valve body 22. This valve flap 48 has a size and shape to overlie the array of flow patterns 40 and the outlet ports 14. As shown in FIGS. 3, 4, and 7, a central region of the valve flap 48 rides relatively closely between the annular seat surface 42 on the upper wall 23 and a plurality of part-annular ribs 50 upstanding from the lower plate 28, with several radial gaps 52 separating the ribs 50 to permit passage of water from the inlet port toward the outer periphery of the valve flap 48.

Figure 10:
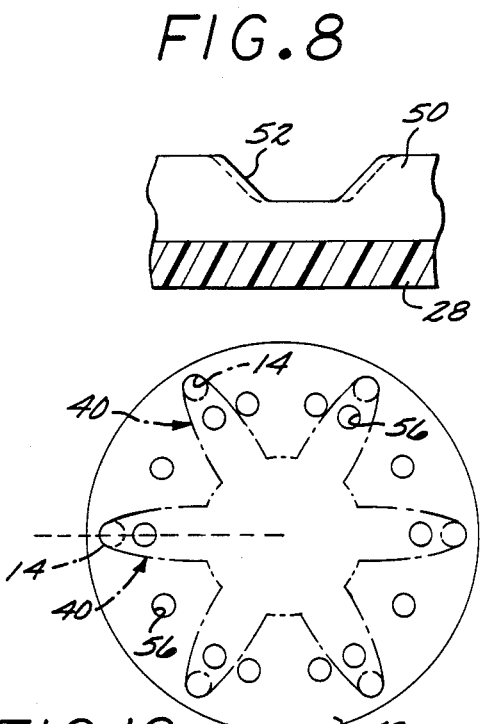
FIG. 10 is a somewhat schematic sectional view taken generally on the line 10—10 of FIG. 3 and illustrating the unit in the first set position.
Figure 12:
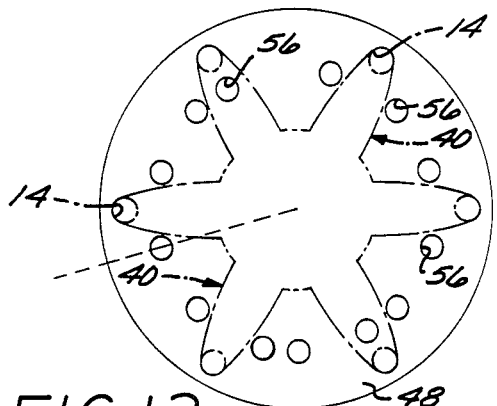
FIG. 12 is a somewhat schematic sectional view similar to FIG. 10 and illustrating the unit in the second set position.
Figure 14:
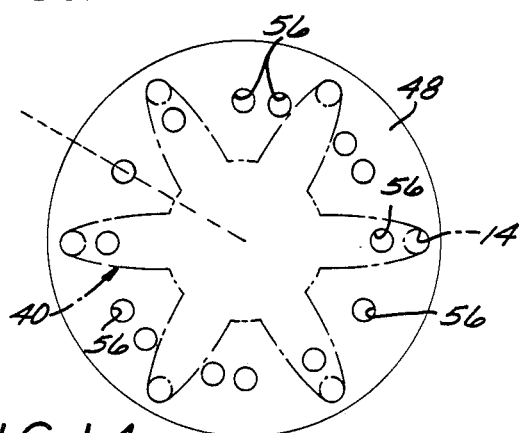
FIG. 14 is a somewhat schematic sectional view similar to FIG. 10 and illustrating the unit in the third set position.

A plurality of relatively small flow passages 56 are formed through the valve flap 48 to permit water flow from the inlet port 32 upwardly through the flap into selected ones of the flow patterns 40. More specifically, these flow passages 56 are formed in a generally circular arrangement as shown in FIGS. 10, 12, and 14, at a radius generally overlying a portion of the emitter groove 46 and flushing channel 44 of each flow pattern 40 but radially inset from the outlet ports 14. Moreover, the circumferential spacing of these flow passages 56 is staggered such that a selected number of the flow passages 56 are aligned with a selected number of the flow patterns 40 and the remaining flow passages 56 overlie the planar upper wall surface 29.

In operation, the valve flap 48 cooperates with the flow patterns 40 aligned with flap flow passages 56 to define water flow paths communicating between the pressure chamber 30 and the associated outlet ports 14, thereby permitting water flow to and through those outlet ports. Conveniently, these water flow paths effectively regulate the water flow rate therethrough by pressure-responsive valve flap deformation into the flow patterns. More particularly, as shown in FIG. 5, at relatively low water pressures such as when water supply coupled to the conduit 12 is turned on or off, the valve flap 48 undergoes little or no pressure-responsive deformation into the patterns 40 to permit a relatively high rate flushing flow through open flushing channels 44 to the associated outlet ports. However, at relatively higher pressures, within the conduit 12, the valve flap is deformed into and substantially closes the flushing channels 44 thereby restricting water flow to the significantly smaller cross-sectional area of the emitter grooves 46, as viewed in FIG. 6, to provide a relatively slow trickle water flow. By appropriate groove and flap design, this trickle flow can be held substantially constant throughout a range of higher water pressures by pressure-compensating flap deformation partially into the emitter grooves.

The number of flow patterns 40 and associated outlet ports 14 open to discharge water flow from the pressure chamber 30 is selectively varied by rotation of the valve flap 48 within the pressure chamber 30 to align a different number of the flap flow passages 56 with a different number of the flow patterns 42. In this regard, the valve flap 48 is rotatably carried by the selector dial 16 shown in the exemplary drawings to have an externally accessible hexagonal slotted head 58 conveniently including an index arrow 60 (FIG. 2) for association with one of several index markings 62 representative of different flap set positions. This selector dial 16 is positioned within the central bore 24 in the valve body upper wall 23 with a radially enlarged lower dial base 66 trapped between an inwardly directed shoulder 68 lining the bore and the upper surface of the valve flap 48. Connector legs 70 project downwardly from the dial base 66 through the valve flap 48, with enlarged beads 72 or the like being formed on the legs 70 beneath the flap 48 to hold the flap in place. Alternatively, the selector dial 16 may have a wide variety of different constructions suitably coupled to the flap 48 and externally accessible to rotate the flap to different set positions.

Figure 9:
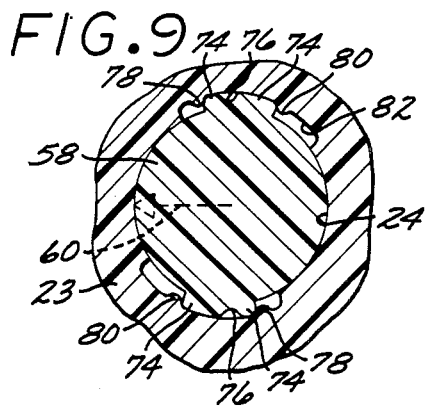
FIG. 9 is a fragmented horizontal section taken generally on the line 9—9 of FIG. 3, and illustrating the unit in a first set position.
Figure 11:
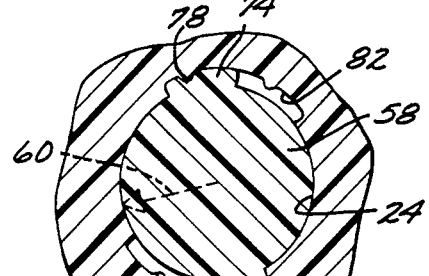
FIG. 11 is a fragmented horizontal section similar to FIG. 9 but illustrating the unit in a second set position.
Figure 13:
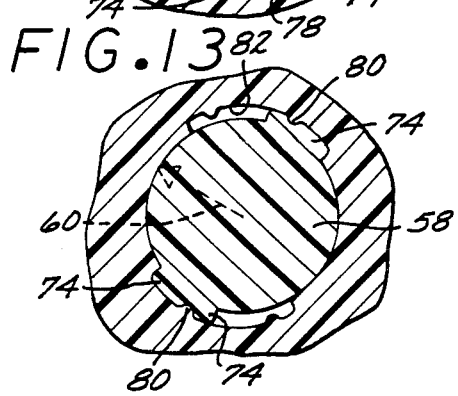
FIG. 13 is a fragmented horizontal section similar to FIG. 9 but illustrating the unit in a third set position.

The head 58 of the illustrative selector dial 16 further includes a pair of circumferentially spaced radially outwardly protruding tabs 74 defining therebetween a small detent 76 for adjustable snap-fit association with small protrusions 78 and 80 formed in a pair of arcuate recesses 82 and 84, respectively, lining the wall bore 29. In a first set position of the valve flap, as shown in FIGS. 9 and 10, the tabs 74 are positioned between the protrusions 78 and 80 to orient a flow passage 56 in alignment with each one of the flow patterns 40 thereby permitting trickle flow through all six outlet ports 14. However, rotation of the selector dial 16 and the valve flap 48 in one direction to a second set position, as shown in FIGS. 11 and 12, seats the protrusions 78 within the detents 76 and realigns the flow passages 56 to overlie only two of the flow patterns 40. Alternatively, the selector dial and flap can be rotated to a third set position with the protrusions 80 seated within the detents 76 to align the flow passages 56 with four of the flow patterns 40, as viewed in FIGS. 13 and 14.

Accordingly, the multiple outlet trickle irrigation unit 10 of the present invention may be adjusted quickly and easily to variably control the number of outlet ports 14 through which irrigation water flow is permitted. The unit 10 can thus be installed and adjusted rapidly by simple rotation of the selector dial 16 to provide the desired number of trickle irrigation outlet flows, with subsequent readjustment being possible in the event alteration in the number of outlet flows is necessary or desirable.

A variety of modifications and improvements to the invention described herein are believed to be apparent to those of ordinary skill in the art. For example, while six outlet ports have been shown and described with respect to the illustrative drawings, it will be appreciated that any number of outlet ports can be provided. Moreover, additional set positions can be provided wherein alternative numbers of outlet ports in addition to the set positions shown and described can be provided with water flows, in accordance with the arrangement of flow passages 56 in the valve flap 48. Accordingly, no limitation on the invention is intended by way of the description herein, except as set forth in the appended claims.

What is claimed is:

1. A trickle irrigation unit, comprising:
   a valve housing defining an internal pressure chamber, an inlet port for inflow of water into the pressure chamber, and a plurality of outlet ports for discharge of water from the pressure chamber, said valve housing further defining a plurality of flow patterns within the pressure chamber and each communicating with a respective one of the outlet ports;
   a resilient valve member within the pressure chamber overlying the flow patterns and outlet ports and having a plurality of flow passages formed therein in a predetermined array for alignment of a selected number of the flow passages with a corresponding selected number of the flow patterns to permit water flow from the pressure chamber into the selected number of flow patterns and further for discharge through the outlet ports associated therewith, said valve member being movable to different set positions having different selected numbers of the flow passages aligned with corresponding different selected numbers of the flow patterns; and
   selector means movably mounted on said valve housing and accessible from the exterior thereof for moving said valve member to the different set positions for variably selecting the number of the outlet ports through which water discharge is permitted.

2. The trickle irrigation unit of claim 1 wherein the inlet port opens into one side of the pressure chamber and the plurality of outlet ports open into another side of the pressure chamber.

3. The trickle irrigation unit of claim 1 wherein the inlet port and the outlet ports open generally into opposite sides of the pressure chamber.

4. The trickle irrigation unit of claim 3 wherein said valve housing is formed by a pair of interfitting housing members cooperatively defining the pressure chamber to have a relatively low-profile, generally circular cross-sectional shape, said valve member comprising a relatively thin and generally disc-shaped valve flap within the valve chamber.

5. The trickle irrigation unit of claim 1 wherein said valve housing includes an outwardly projecting tubular spike having the inlet port formed therethrough.

6. The trickle irrigation unit of claim 5 wherein said spike has a barbed distal end.

7. The trickle irrigation unit of claim 1 wherein said valve housing includes a plurality of outwardly projecting outlet tubes each having a respective one of said outlet ports formed therethrough.

8. The trickle irrigation unit of claim 1 wherein said valve member is rotatable within the pressure chamber, said selector means including an externally accessible selector dial rotatably supported on said valve housing and coupled to said valve member for rotating said valve member in response to rotation of said selector dial.

9. The trickle irrigation unit of claim 1 including externally visible means for indicating the selected set position of said valve member.

10. The trickle irrigation unit of claim 1 wherein each of the flow patterns includes means forming a relatively shallow flushing channel communicating with a respective one of the outlet ports and a relatively shallow emitter groove surrounded by the flushing channel and communicating with the respective one of the outlet ports, said valve member cooperating with the selected number of flow patterns having the flow passages aligned therewith and being deformable into the selected flow patterns to control the rate of water flow to the associated outlet ports.

11. The trickle irrigation unit of claim 1 wherein said valve member comprises a resilient valve flap, and wherein said valve housing includes a generally planar surface with the pressure chamber generally surrounding the outlet ports, said planar surface being interrupted by the flow patterns recessed into said valve housing, said valve flap being urged by pressure within the pressure chamber into seated relation with said planar surface and overlying the outlet ports and the flow patterns, whereby the selected number of flow passages in said valve flap permit water flow from the pressure chamber into the aligned flow patterns and the remaining ones of the flow passages are blocked by the planar surface against substantial water flow therethrough.

12. The trickle irrigation unit of claim 11 wherein the flow passages are formed in said valve flap in a generally circular and circumferentially staggered array for overlying portions of the selected flow patterns and offset from direct alignment with the outlet ports.

13. The trickle irrigation unit of claim 12 wherein said inlet port opens generally centrally into one side of the pressure chamber, wherein the outlet ports are formed generally in a circular arrangement opening into an opposite side of the pressure chamber and generally centered about the inlet port, wherein said flow patterns are formed to extend generally radially outwardly between said inlet port and said outlet ports, and wherein said flow passages in said valve flap are radially inset relative to the outlet port.

14. A trickle irrigation unit for connection to a water supply conduit, comprising:
   a valve housing including first and second interfitting housing portions cooperatively defining a relatively low profile pressure chamber;
   said first housing portion defining an inlet port for communicating with the interior of the water supply conduit and for coupling a flow of water from the conduit generally centrally into the pressure chamber;
   said second housing portion defining a plurality of outlet ports formed generally in a circular arrangement centered generally about the inlet port, said second housing portion further including a generally planar surface surrounding the outlet ports within the pressure chamber and interrupted by a plurality of recessed flow patterns extending generally radially between the inlet and the outlet ports with said flow patterns communicating respectively with the outlet ports;

a flexible resilient valve flap within the pressure chamber between the inlet port and the outlet ports and overlying the outlet ports and the flow patterns, said valve flap being urged by water pressure within the pressure chamber into seated engagement with said planar surface;

said valve flap having a generally circular array of flow passages formed therein centered generally about the inlet port and formed on a radius for overlying portions of the flow patterns and offset from the outlet ports; and a selector dial rotatably supported on said valve housing and connected to said valve flap for rotating said valve flap within the pressure chamber to a plurality of different set positions;

said array of flow passages in said valve flap being circumferentially staggered to position a different selected number of the flow passages in alignment with a corresponding selected number of the flow patterns for each of said set positions for selectively varying the number of the flow patterns communicating through the flow passages for receiving water flow from the pressure chamber thereby correspondingly varying the number of the outlet ports coupled to the pressure chamber.

15. The trickle irrigation unit of claim 14 wherein said first housing portion further includes means for mounting said valve housing onto the water supply conduit.

16. The trickle irrigation unit of claim 15 wherein said mounting means comprises a tubular spike for piercing the water supply conduit, said inlet port being formed through said spike.

17. The trickle irrigation unit of claim 14 wherein said selector dial is rotatably supported on said second housing portion.

18. The trickle irrigation unit of claim 17 wherein said selector dial includes a connecting leg projecting through said valve flap and an enlarged retention bead on said leg at the side of said flap opposite said second housing portion.

19. The trickle irrigation unit of claim 14 wherein said selector dial includes an externally accessible slotted head.

20. The trickle irrigation unit of claim 14 wherein said selector dial includes an externally accessible hexagonal head.

21. The trickle irrigation unit of claim 14 including detent means reacting between said selector dial and said valve body for releasably supporting said selector dial in each of said set positions.

22. A trickle irrigation unit, comprising:

a valve housing defining an internal pressure chamber, an inlet port for inflow of water into the pressure chamber, and a plurality of outlet ports for discharge of water from the pressure chamber;

flow control means including a valve member comprising a valve flap having a staggered array of flow passages formed therein within the pressure chamber and movable to different set positions for respectively and selectively coupling different selected numbers of the outlet ports into flow communication with the pressure chamber to permit water discharge flow therethrough and for substantially preventing flow communication between the pressure chamber and the remaining ones of the outlet ports, said flow control means further including means forming a plurality of recessed flow patterns each communicating with a respective one of the outlet ports, said valve flap overlying the flow patterns and the outlet ports with a different selected number of the flow passages aligned with a corresponding number of the flow patters in offset relation to the outlet ports in each of the different set positions; and selector means movably mounted on said valve housing and accessible from the exterior thereof for moving said valve member to the different set positions for variably selecting the number of outlet ports through which water discharge is permitted.

23. The trickle irrigation unit of claim 22 wherein said valve member is rotatable within the pressure chamber, said selector means including an externally accessible selector dial rotatably supported on said valve housing and coupled to said valve member for rotating said valve member in response to rotation of said selector dial.

24. The trickle irrigation unit of claim 22 further including detent means for releasably supporting said selector means and said valve means in each of the different set positions.

* * * * *